Jan. 1, 1957  E. A. ANDREW  2,775,788
EXTRUSION APPARATUS
Filed March 28, 1955
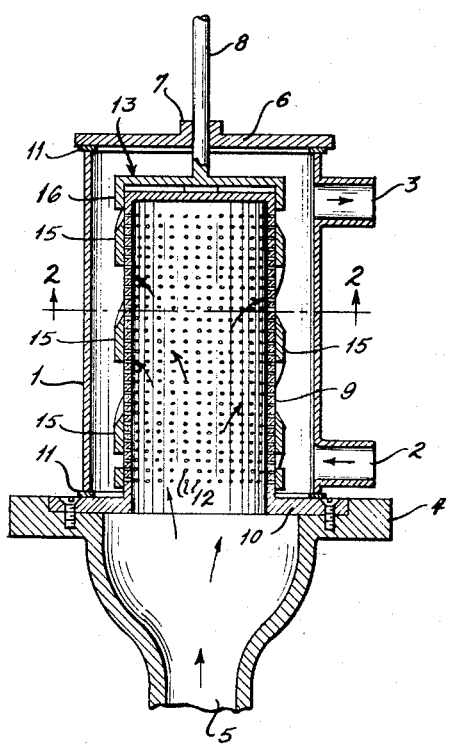
FIG.1.
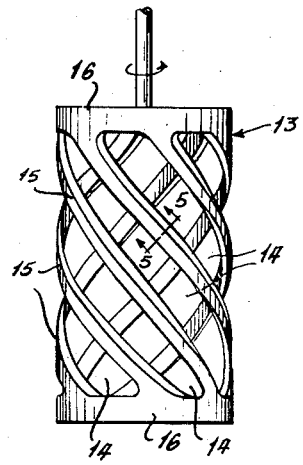
FIG.3.
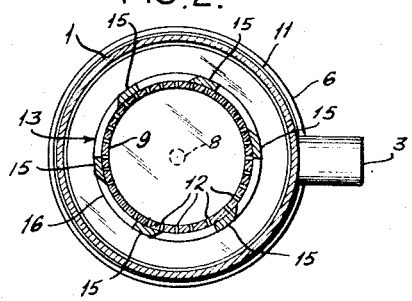
FIG.2.
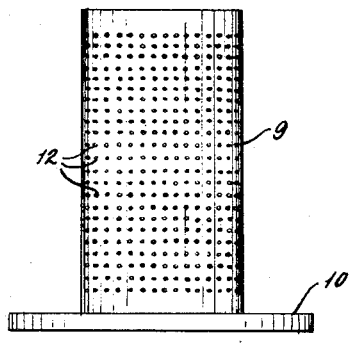
FIG.4.
FIG.5.
INVENTOR
EUGENE A ANDREW
By Bruninga and Sutherland
ATTORNEYS.

United States Patent Office

2,775,788
Patented Jan. 1, 1957

2,775,788

EXTRUSION APPARATUS

Eugene A. Andrew, St. Louis, Mo., assignor to Olin Mathieson Chemical Corporation, East Alton, Ill., a corporation of Virginia Application March 28, 1955, Serial No. 496,968

1 Claim. (Cl. 18—12)

This invention relates generally to the treatment of plastics and particularly to an apparatus for extruding a body of lacquer or the like and simultaneously cutting the extrusions into discrete particles.

In my copending application Serial No. 470,412, filed November 22, 1954, and the copending application of myself and Ralph L. Cook, Serial No. 460,014, filed October 4, 1954, there is disclosed an apparatus for extruding lacquer or the like, and concomitantly severing the extruded streams into discrete particles. As disclosed in those applications, the lacquer to be extruded is introduced under pressure into a chamber from which the lacquer escapes through a plurality of extrusion orifices in a flat plate; and cutter blades are mounted for rotation so that each passes successively across the series of orifices and severs the increment of lacquer which has been extruded through each orifice (since a blade last passed that orifice) from the body of lacquer within the orifice and within the pressure chamber. The cutter is mounted for rotation about an axis disposed centrally of the orifice plate, and consequently, each blade of the cutter passes successively over all of the orifices in that plate during each revolution of the cutter. In such an arrangement, however, the lineal velocity of the cutter blades increase from the center of rotation outwardly. Thus when a cutter blade moves through an extrusion located toward the outer edge of the orifice plate, it is moving at a higher velocity than when it moves through a similar extrusion from an orifice located nearer the center of the orifice plate. This uneven velocity of cutting results, to a small extent, in uneven or ragged cutting of the extrusions. Furthermore, since the cutter blades have width, each orifice is covered by the blade in passing so that where the blade is of uniform width from end to end, the orifices near the center are covered by the blade for a longer increment of time, during each pass, than are the orifices farther from the center; and this results in some unevenness of the length of the extrusion severed. Moreover, with an arrangement of the kind disclosed in said applications where the cutter blades project from a central hub, a good portion of the orifice plate near its center is not useable because it is covered by the hub; and this restricts the number of blades which may be used because the space between blades must be sufficient to enable an extrusion of the desired length to take place between passes of successive blades. For example, with an orifice plate four inches in diameter, the maximum practical number of cutter blades is four.

The object of the invention generally stated is to provide an apparatus for extruding and severing lacquer and the like in which the rate of production of severed bodies is higher, and the product more uniform than with the apparatus disclosed in the aforesaid applications.

A more specific object of the invention is to provide a device for the purpose described wherein the velocity of cutting at all orifices is constant.

A further specific object of the invention is to provide a device for the purpose described wherein the number of cutting edges may be increased over that which is practical with devices of the type disclosed in the aforesaid application.

Generally stated, these objects are accomplished by extruding the lacquer or the like through a multiplicity of orifices in a cylindrical wall, and concurrently moving a series of blades about said wall in shearing relationship with the edges of the multiplicity of orifices. For example, the chamber into which the lacquer is introduced under pressure and from which the lacquer is extruded, may be provided with an exterior cylindrical wall having a multiplicity of orifices therein. A series of cutter blades, each extending in the general axial direction of said cylinder, is mounted for rotation relative to the cylinder and coaxial therewith, so that the blades ride upon the surface of the cylinder, and, in each revolution, each blade successively passes all of the orifices at the same lineal velocity and each blade obstructs the passage of lacquer through each orifice for the same increment of time. Thus a four inch diameter cylinder may be equipped with as many as twelve blades.

One embodiment of the invention is illustrated in the accompanying drawing in which:

Figure 1 is a longitudinal sectional view of such an apparatus;

Figure 2 is a sectional view taken along line 2—2 of Figure 1;

Figure 3 is a view in side elevation of the cutter element shown in Figure 1;

Figure 4 is a view in side elevation of the cylindrical extrusion chamber shown in Figure 1; and Figure 5 is a sectional view taken along line 5—5 of Figure 3.

In the form shown in the drawing, the apparatus comprises an enclosing vessel 1, preferably of cylindrical shape, having an intake port 2 for suspending liquor, and an outlet port 3 for discharging the suspension of lacquer particles in suspending liquor. The vessel 1 is mounted upon a base 4 having a central inlet 5 for receiving lacquer under pressure from an external source, not shown. The vessel 1 is also provided with a cap 6 having a central hub 7 which latter provides a bearing and seal for a shaft 8 driven by an external source of power, not shown.

A chamber element 9, having an exterior cylindrical surface and a mounting flange 10, is mounted upon base 4 and the cylindrical wall of vessel 1 is secured in sealed relationship to flange 10, as shown at 11, so that a substantial space is provided between the exterior of chamber 9 and the interior surface of vessel 1. With the arrangement as shown, the lacquer under pressure, introduced through inlet 5, occupies the interior of chamber 9, and in order to extrude the lacquer, the cylindrical wall of chamber 9 is provided with a multiplicity of orifices 12. The pressure on the lacquer within chamber 9 forces the lacquer out through orifices 12. The several orifices 12 have a diameter chosen in accordance with the size of the streams it is desired to extrude through them. Preferably all of the orifices in a given chamber 9 are of the same size.

On the end of shaft 8 within vessel 1, there is mounted a cutter element 13 which, in the form shown in the drawing, is an open-ended cylinder having an internal diameter such as to provide a running fit with the exterior cylindrical surface of chamber 9. The cylindrical wall of cutter element 13 is cut away by the removal of strips of material therefrom, as shown at 14, in order to provide a series of spaced blades 15 which are integral with circular bands 16 at the opposite ends thereof. In the form shown, the several blades 15 extend in a general spiral direction about the cylinder. The spiraling of the blades has the advantage that when the cutter element is rotated in direction shown by the arrow on Figure 3, the movement of blades deflects the severed lacquer particles in an upward direction which is concurrent with the movement of the suspending liquor through the vessel 1. The spiraling has the further advantage that the cut made thereby is a drawing cut as distinguished from a chopping cut, and thus lightens the load upon the device. The spiraling of the blades so that one end thereof is circumferentially displaced from the other end thereof, at least a distance corresponding to the circumferential distance between successive blades, has the additional advantage of imposing a constant and uniform, as distinguished from a jerky, load upon the external driving means (not shown) for shaft 8. However, where the orifices 12 are placed very close together, the blades 15 may extend axially of the cutter element 13 without rendering the load upon the driving means seriously non-uniform.

After the removal of the strips 14, the residual blades 15 may be ground down to provide a cutting edge at their leading edges so that the resultant cross section of each blade 15 is substantially as shown in Figure 5.

A cutter element of the character described not only serves the purpose of severing the increments of lacquer which have been extruded through orifices 12 by a shearing action at the edges of such orifices, but in addition thereto, by its rotation within the space between chamber 9 and the interior of vessel 1, imparts sufficient motion to the supsending liquor in such space as to immediately suspend the severed discrete particles of lacquer, and to maintain the same suspended in the suspending liquor so that the mixture which is discharged through port 3 is a suspension of lacquer particles in the suspending liquor; it being understood that a continuous supply of suspending liquor is introduced into the vessel 1 through port 2.

From the foregoing description, those skilled in the art should readily understand that the invention accomplishes its objects and provides an apparatus for the manufacture of small discrete bodies of uniform size severed from a multiplicity of extrusion streams so that the rate of production of such discrete bodies may be vastly increased over the production rate possible with apparatus of the character shown in the aforesaid copending applications. Moreover, the nesting of the exterior cylindrical wall of chamber 9 within the cutter element 13 provides a substantial bearing which minimizes vibration and eliminates the warpage and misalignment of the cutter blades with reference to the orifice plate which has been experienced with devices of the character heretofore employed. Thus the present invention reduces the amount of maintenance required on such an apparatus.

While in the foregoing description the invention has been described in connection with an embodiment wherein the pressure chamber with its cylindrical wall is stationary and the cutter is rotated, it will be understood that the invention contemplates the opposite arrangement of such parts whereby the cutter is maintained stationary and the chamber is driven in rotation, and indeed contemplates the driving of both at relative speeds of rotation.

While one complete embodiment of the invention has been disclosed in detail, it is to be distinctly understood that the invention is susceptible of numerous modifications, variations, and adaptations which those skilled in the art will be expected to make as the apparatus may be applied to particular problems. It is, therefore, to be distinctly understood that the invention is not limited by the foregoing disclosure except as indicated in the appended claim.

Having thus described the invention, what is claimed and desired to be secured by Letters Patent is:

An apparatus for extruding and slicing lacquer and the like and suspending the same in liquor, comprising an enclosing vessel having a liquor intake port and a liquor outlet port, a chamber mounted within said vessel, said chamber having a closed end, an inlet end, and a perforated cylindrical wall, means for forcing lacquer into the chamber through said inlet end and out through said perforated cylindrical wall into the space between said cylinder and said vessel, a cutter having an inclined blade riding upon the exterior of said perforated cylindrical wall within said space, and means for driving said cuter in relative rotation about the axis of said cylindrical wall, said blade being inclined with respect to the axis of said cylindrical wall in the direction which during rotation thereof urges material in said space toward the outlet port of said vessel.

References Cited in the file of this patent

UNITED STATES PATENTS

| | | |
|---|---|---|
| 2,319,859 | Hale | May 25, 1943 |
| 2,422,480 | Gordon | June 17, 1947 |
| 2,637,359 | Taylor | May 5, 1953 |